United States Patent
Baldischweiler et al.

(10) Patent No.: US 7,093,765 B2
(45) Date of Patent: Aug. 22, 2006

(54) TRANSPONDER, ESPECIALLY FOR A CONTACTLESS CHIP CARD

(75) Inventors: Michael Baldischweiler, München (DE); Klaus Finkenzeller, München (DE)

(73) Assignee: Giesecke & Devrient GmbH, Munich (DE)

( * ) Notice: Subject to any disclaimer, the term of this patent is extended or adjusted under 35 U.S.C. 154(b) by 319 days.

(21) Appl. No.: 10/181,938

(22) PCT Filed: Feb. 1, 2001

(86) PCT No.: PCT/EP01/01058

§ 371 (c)(1),
(2), (4) Date: Oct. 7, 2002

(87) PCT Pub. No.: WO01/57790

PCT Pub. Date: Aug. 9, 2001

(65) Prior Publication Data

US 2003/0121985 A1  Jul. 3, 2003

(30) Foreign Application Priority Data

Feb. 4, 2000 (DE) ............................. 100 04 922

(51) Int. Cl.
*G06K 19/06* (2006.01)
(52) U.S. Cl. ............... 235/492; 235/451; 235/487; 340/572.1; 340/572.2; 340/572.5; 340/272.4; 340/825.49; 340/573.4
(58) Field of Classification Search ............... 235/492, 235/451, 487; 713/322, 22; 340/572.5, 340/572.1–572.2, 272.4, 825.49, 573.4, 10.34, 340/10.42, 10.2, 472.5, 10.1, 933; 369/13.08; 455/130, 220, 41.2; 365/192; 710/301
See application file for complete search history.

(56) References Cited

U.S. PATENT DOCUMENTS

| | | | | |
|---|---|---|---|---|
| 4,885,571 A | * | 12/1989 | Pauley et al. | 340/573.4 |
| 5,680,459 A | * | 10/1997 | Hook et al. | 340/573 |
| 5,838,254 A | * | 11/1998 | Kokubu et al. | 340/10.34 |
| 5,852,386 A | * | 12/1998 | Chantry et al. | 331/94.1 |
| 5,867,100 A | * | 2/1999 | D'Hont | 340/572.1 |
| 6,035,357 A | * | 3/2000 | Sakaki | 710/301 |
| 6,054,858 A | * | 4/2000 | Dumoulin et al. | 324/322 |
| 6,208,235 B1 | * | 3/2001 | Trontelj | 340/10.1 |
| 6,229,774 B1 | * | 5/2001 | Yasuda | 369/47.28 |
| 6,298,225 B1 | * | 10/2001 | Tat et al. | 455/220 |
| 6,342,844 B1 | * | 1/2002 | Rozin | 340/933 |

(Continued)

FOREIGN PATENT DOCUMENTS

JP  0 909 049 A2 *  4/1999

(Continued)

*Primary Examiner*—Thien M. Le
*Assistant Examiner*—Allyson N Trail
(74) *Attorney, Agent, or Firm*—Bacon & Thomas, PLLC

(57) ABSTRACT

A transponder located for example in a contactless smart card receives energy via an antenna (L2) from a high-frequency alternating field. A voltage ($U_{dd}$) formed with a rectifier (12) is fed as a control quantity to a clock generator (14) with a clock frequency adjusting device. At high field strength on the antenna, the voltage ($U_{dd}$) is adjusted downwards by increasing the clock frequency for a digital circuit (10). If no further increase of clock frequency of the clock signal (CLK) is possible, a charge pump (16) is connected for an EPROM (18) in order to increase the writing speed thereof. Optionally, a conventional shunt regulator can be connected as well. An interface circuit (20) is not affected by the adjusted clock frequency, but works at fixed frequency during communication with a reader.

13 Claims, 2 Drawing Sheets

U.S. PATENT DOCUMENTS

| | | |
|---|---|---|
| 6,354,500 B1 * | 3/2002 | Gercekci et al. ............. 235/451 |
| 6,356,198 B1 * | 3/2002 | Wuidart et al. .......... 340/572.5 |
| 6,515,919 B1 * | 2/2003 | Lee ............................ 365/192 |
| 2002/0120850 A1 * | 8/2002 | Walker et al. ............... 713/178 |
| 2003/0102960 A1 * | 6/2003 | Beigel et al. ............... 340/10.1 |

FOREIGN PATENT DOCUMENTS

WO  WO000137214  * 11/1999

* cited by examiner

TRANSPONDER, ESPECIALLY FOR A CONTACTLESS CHIP CARD

BACKGROUND OF THE INVENTION

This invention relates to a transponder, in particular a transponder for a contactless smart card. The term "transponder" refers here to an assembly comprising an antenna and an electronic circuit, in particular in the form of a chip, the energy required for operating the chip as well as data being received via the antenna formed as a coil. Such transponders are used in contactless smart cards, in labels provided on goods, in keys, particularly auto keys as immobilizers, and—usually incorporated in glass or porcelain capsules—in animal bodies for identification.

Said transponders are designed for unidirectional or bidirectional data exchange with an external device, referred to here as a reader. The reader radiates a high-frequency magnetic field via an antenna, the transponder taking energy from the magnetic field via a large-surface coil in fairly close proximity to the reader. At the same time as it absorbs energy, the transponder derives a clock signal. The structure and operation of such transponders is described extensively in the prior art, reference being made for example to US-C 5 841 123, the article "Kontaktlose Chipkarten" by Klaus Finkenzeller, Funkschau 19/98, pp. 40–43, and Klaus Finkenzeller, RFID-Handbuch, Carl Hanser Verlag, Munich/Vienna, 1999.

In order to facilitate the understanding of the invention, the basic features of a transponder will be explained in the following, being set forth later in more detail with reference to the description of the figures.

A reader radiates a high-frequency magnetic field of e.g. 13.56 MHz via an antenna. If the antenna of a transponder is located in said magnetic field, energy is coupled into the transponder due to the negative feedback between the two antennas. Electric power available to the transponder is proportional to magnetic field strength on the antenna. Field strength on the transponder is in inverse proportion to distance ($1/x^3$) from the reader and thus varies very greatly in the working condition.

The microchip requires a constant supply voltage, operation being effected at a constant clock frequency. At very short distances between reader and transponder, the voltage induced in the transponder would exceed the required supply voltage if no countermeasures were taken. A shunt regulator is therefore switched in parallel with the load for converting excess power into heat to keep the supply voltage constant in the case of increased induced voltage in the transponder.

SUMMARY OF THE INVENTION

It is an objective of the present invention to provide a transponder wherein the electric power available in the transponder is utilized better than in known transponders.

For this purpose the invention provides a transponder with an internal digital circuit operated by a clock generator with a clock signal having a clock frequency, and an internal energy supply fed contactlessly by an external alternating magnetic field. According to the invention it is provided in this transponder that the clock generator has a clock frequency adjusting device for adjusting the clock frequency of the clock signal in dependence on the field strength of the external magnetic field on the transponder.

The term "in dependence on field strength" means that adjustment of the clock frequency of the clock signal is either directly dependent on field strength or indirectly dependent on field strength. Field strength can be measured and the clock frequency adjusted in dependence on the measuring result, but the clock frequency can also be varied in dependence on induced voltage since induced voltage depends on the field strength on the antenna. In the inventive transponder, the clock frequency at which the digital circuit (microchip) works is readjusted in dependence on field strength, that is, in dependence on the distance between reader and transponder. At small distances between reader and transponder a relatively great amount of energy is available in the transponder. Accordingly, the clock frequency can be increased. Instead of destroying the excess energy with the aid of the shunt regulator, the clock frequency of the clock signal is increased.

Looking at a typical microchip executed in CMOS technology, energy consumption P in such a circuit corresponds to $$P = C_L \times U_{dd}^2 \times f_d$$

where
 P=Power used in a gate
 $C_L$=Circuit capacitance of the gate
 $U_{dd}$=Operating voltage
 $f_d$=Average working frequency (clock frequency)

At constant or almost constant values of $C_L$ and $U_{dd}$ a linear dependence thus results between energy consumption of the CMOS circuit, on the one hand, and clock frequency of the working clock, on the other hand.

The inventive measure thus causes the clock frequency to be increased continuously or in steps at distances between transponder and reader that are below the maximum possible distance, so that operations in the microchip run faster. Excess energy that used to be exclusively destroyed by the shunt regulator is thus utilized according to the invention to increase operating speed, that is, to shorten the total operating time.

On the other hand, the inventive measure can be utilized to reduce the distance up to which energy can be fed from the reader into the transponder. At relatively great distances the clock frequency can be reduced to a permissible limit so that the microchip components are just operational. It has tuned out that the inventive measure permits the transponder range, that is, the maximum distance between reader and transponder to be minimally observed for operation, to be increased by about 30 to 50%.

Transponders usually have a rectifier at the output of the receive antenna. The unregulated voltage delivered by the rectifier is used in a preferred embodiment of the invention as an actual value and control quantity. It is compared with an internally generated reference voltage, and the clock frequency of the working clock for the microchip is adjusted from the differential signal, which is representative of the field strength and the distance between reader and transponder.

There are several possibilities for realizing the clock adjustment. It is preferred according to the invention to use a voltage-controlled oscillator (VCO) whose input receives the unregulated voltage from the rectifier and whose output delivers the clock signal, said clock signal optionally being processed further, for example fed to a signal conditioner and/or a frequency divider.

In a further preferred embodiment of the invention, clock frequency adjustment is realized with the aid of an adjustable frequency divider. For this purpose the differential signal obtained from a reference signal and the unregulated voltage of the rectifier is converted into a digital value by an analog-to-digital converter, optionally processed additionally and then supplied to the adjusting input of an adjustable frequency divider whose signal input receives the clock signal of fixed frequency (e.g. 13.56 MHz) received by the transponder. At the output of the adjustable frequency divider the clock signal is then formed. The smaller the distance between reader and transponder, the higher the unregulated voltage at the output of the rectifier is, the higher the difference with respect to the reference voltage is, the greater the digital value obtained by the A/D converter is, and the smaller the divisor of the frequency divider is, and the output signal of the frequency divider as a clock signal is according high.

It should be pointed out that adjustment of the clock signal relates exclusively to strictly internal operation sequences of the transponder. For communication with the reader a fixed, normalized clock frequency is required. Said clock frequency is transferred from the reader to the transponder via the high-frequency magnetic field and is conditioned in the transponder for operating an interface circuit.

Components in the digital circuit of the transponder that are operated by an adjustable-frequency clock signal are for example a RAM, a microcontroller, an EEPROM, etc. The inventive measure of varying clock frequency in dependence on distance between transponder and reader leads to accordingly high clock frequencies at very small distances. There is of course an upper limit for clock frequency. In a preferred embodiment of the invention it is provided that when a defined maximum clock frequency is reached
  a charge pump is connected in order to increase the writing speed of an EEPROM belonging to the digital circuit, and/or
  a shunt regulator is activated in order to convert excess energy into heat with the aid of a resistive element.

Optimal operation at very small distances between transponder and reader thus takes place in such a way that excess energy is first utilized to increase the clock frequency of the working clock. When the maximum clock frequency is reached the charge pump is connected for operating the EEPROM of the microchip, and when the charge pump is working at maximum power the shunt regulator known in the art is finally activated.

The invention is suitable in particular for use in a smart card, but other uses are also possible. For example the inventive transponder can be used quite generally in an identification element, for example a label provided on goods, on shelves and the like. It can also be used in a key for opening doors or in an ignition key for releasing an immobilizer. A further possibility of use is in breeding animals on farms for facilitating management and feeding.

BRIEF DESCRIPTION OF THE DRAWINGS

In the following, examples of the invention will be explained in more detail with reference to the drawing, in which.

DETAILED DESCRIPTION OF THE PREFERRED EMBODIMENTS

Figure 1:
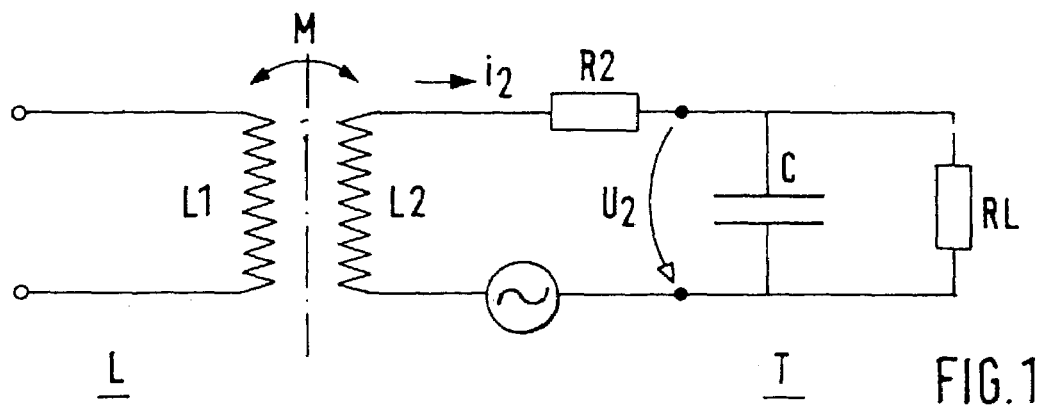
FIG. 1 shows an equivalent circuit diagram of a known transponder in connection with a schematically shown reader.

According to FIG. 1, reader L radiates a high-frequency magnetic field of e.g. 13.56 MHz via antenna L1. If antenna L2 of transponder T is located in said magnetic field, energy is coupled into transponder T due to negative feedback M between antennas L1 and L2, current i2 flows through resistor R2 of the input circuit. RL designates the load formed by a microchip. In parallel with load RL is capacitor C that forms together with antenna L2 a resonant circuit tuned to the transmitter frequency of reader L.

Electric power available to the transponder is proportional to magnetic field strength on antenna L2. For the energy required for operating the microchip to be received, antenna L2 must be at a minimum distance from reader L. The course of the field strength in dependence on the distance from antenna L1 of reader L indicates that field strength can vary by more than a factor of 30 in the currently customary working areas of known smart cards (field strength H=0.15 . . . 5 [A/m]).

The microchip requires constant supply voltage, operation is effected at constant clock frequency. The circuit shown in FIG. 1 is designed so that when antenna L2 is at a defined minimum distance from antenna L1 the required supply voltage for operating the components of the microchip (RAM, EEPROM, microcontroller, etc.) is just reached. At shorter distances between reader L and transponder T the voltage induced in the transponder would exceed the required supply voltage if no countermeasures were taken.

Figure 2:
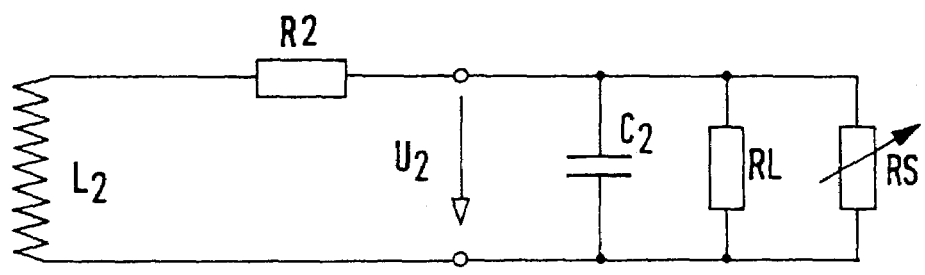
FIG. 2 shows an equivalent circuit diagram of a transponder with a shunt regulator for voltage regulation.

According to FIG. 2, shunt regulator RS is therefore switched in parallel with load RL for converting excess power into heat to keep supply voltage U2 constant in the case of increased induced voltage in the transponder.

In dependence on the distance between reader L and transponder T, the shunt regulator is thus in the dormant, i.e. high-impedance, state (when transponder T exceeds the maximum distance permitting operation of the transponder) or shunt regulator RS is maximally conductive, i.e. when the smallest distance between reader L and transponder T is present. The equivalent circuit diagram of transponder T shown in FIG. 2 shows shunt regulator RS as a variable resistor. The specific embodiment of shunt regulators in integrated chips is known to the expert.

Figure 4:
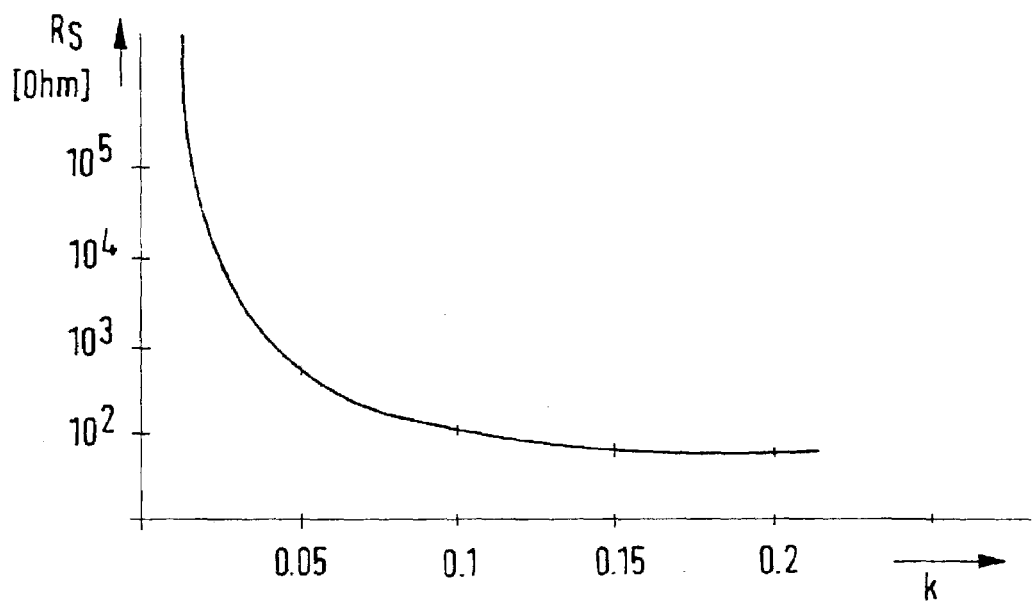
FIG. 4 shows a graphic representation of the resistance of a shunt regulator in dependence on the coupling factor between a receive antenna of a transponder and an external magnetic field.

FIG. 4 shows the input resistance of shunt regulator RS in dependence on the coupling factor between the antenna coil of the transponder and the antenna coil of the reader. An increase in coupling factor k corresponds to a decrease in distance between the two antennas.

As one can see in FIG. 4, the input resistance of shunt regulator RS is infinitely high at a very small coupling factor (large distance) between the antennas, then decreasing rapidly when the maximum operating distance is reached.

In the design of a transponder the energy supply must be such that the microchip is operable at a predetermined maximum distance between reader and transponder. The shunt regulator is not yet active in this state.

The above requirement for the design of a transponder also means that whenever the transponder is at a distance from the reader falling below the maximum distance, the shunt regulator is active in order to keep voltage U2 constant by converting additionally absorbed power into heat. As soon as the transponder approaches the reader for data exchange therewith, more energy is thus coupled into the transponder than is necessary for operation when the maximum possible distance is fallen below.

Figure 3:
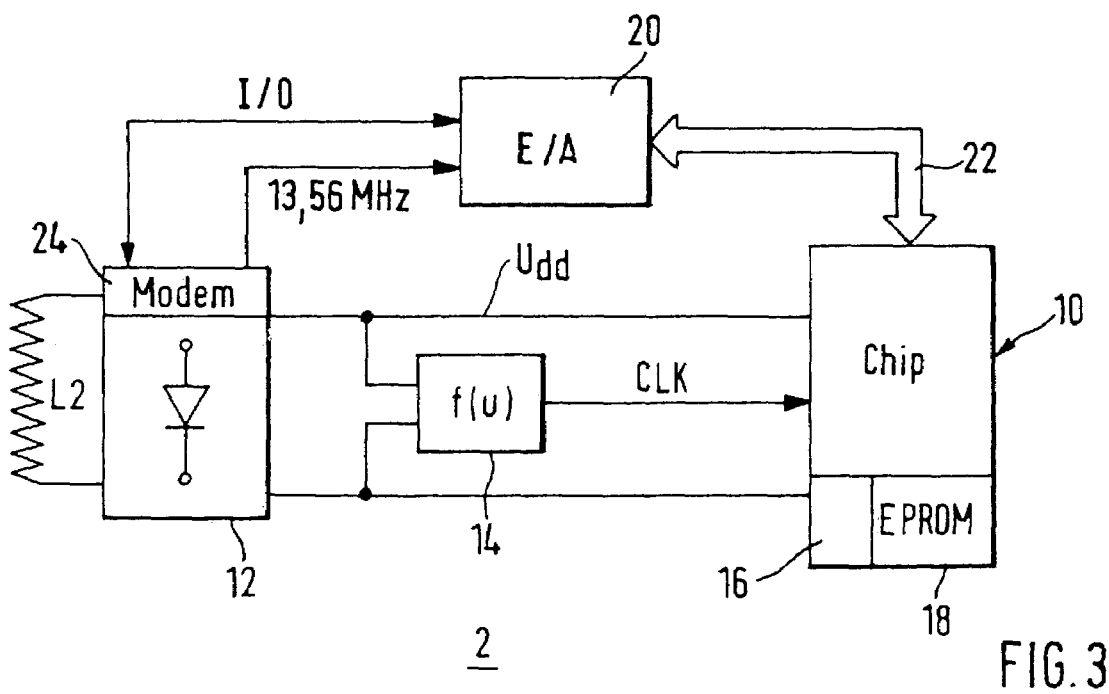
FIG. 3 shows a block diagram of an embodiment of an inventive transponder.

FIG. 3 shows an embodiment of inventive transponder 2. Transponder 2 contains abovementioned receive antenna L2 formed as a flat coil to which rectifier 12 is connected. Connected to the output of rectifier 12 is microchip 10 that receives rectified output voltage $U_{dd}$ from rectifier 12. Voltage $U_{dd}$ is also received by clock generator 14 containing a clock frequency adjusting device that regulates clock frequency CLK of microchip 10 in dependence on induced and rectified voltage $U_{dd}$. This dependence of the frequency of clock signal CLK on induced voltage is indicated in the block of clock generator 14 by the function f(u).

The various components of the microchip are not all shown individually here. What is shown is EPROM 18 and charge pump 16, to be dealt with below. Over bus 22 microchip 10 is connected with interface circuit 20. Interface circuit 20 receives from modem 24 a clock signal delivered by the reader via the high-frequency magnetic field, at a frequency of 13.56 MHz here. For transmitting data, interface circuit 20 feeds transmittal data to modem 24 so that the data are radiated via antenna L2.

FIG. 3 likewise omits the shunt regulator present in microchip 10, as is shown on the right in the equivalent circuit of FIG. 2.

When antenna L2 of transponder 2 shown in FIG. 3 comes into proximity of a reader not shown here, thereby falling below a certain distance from the device, rectifier 12 delivers rectified voltage $U_{dd}$ that is great enough to permit operation of microchip 10, thus of the total transponder. If the distance from the reader is reduced further, voltage $U_{dd}$ rises somewhat, whereby the voltage is adjusted downwards to a steady-state deviation with the aid of inventive clock frequency adjusting device 14 via the frequency-dependent current consumption of the microchip.

While in conventional transponders operation is effected at a fixed frequency generated by division of the transmitter frequency of the reader, for example 3.39 MHz (13.56 MHz/4), operation is already possible at a much lower frequency in the transponder shown in FIG. 3. When the distance between reader and transponder rises above a certain value, however, there is no operation in the transponder. When the range is fallen below, more energy is fed into transponder 2 than would actually be necessary for operating the transponder. This excess energy is utilized to increase the clock frequency of working clock CLK, thereby increasing the efficiency of transponder 2.

Figure 5:
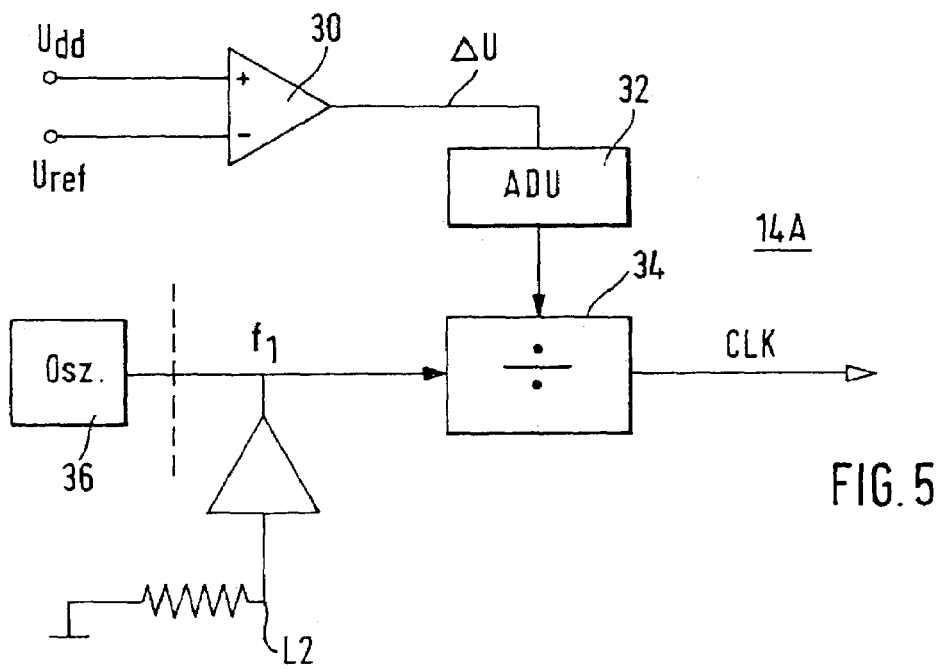
FIG. 5 shows a simplified block diagram of a special embodiment of a clock frequency adjusting device.

Referring to FIG. 5, a first special embodiment of clock generator 14 according to FIG. 3 will be explained, provided with reference sign 14A in FIG. 5.

DC voltage $U_{dd}$ coming from rectifier 12 is compared in comparator 30 with reference voltage $u_{ref}$ generated internally in the transponder. Voltage difference $\Delta u$ is converted by analog-to-digital converter (ADC) 32 into a digital value that is fed to an adjusting input of adjustable frequency divider 34. The signal input of frequency divider 34 receives a signal with fixed frequency f1 (e.g. 13.56 MHz) derived from the voltage induced on coil L2. Alternatively, the signal with fixed frequency f1 can be generated by oscillator 36 disposed in the transponder.

In dependence on the digital value fed to the adjusting input, relatively high frequency f1 is divided so that the frequency of working clock CLK at the output of frequency divider 34 is accordingly high at high voltage $U_{dd}$, i.e. high differential signal $\Delta u$.

If the frequency of working clock CLK is so high due to the small distance between transponder 2 and the reader that a further increase is impossible for operation of microchip 10, charge pump 16 indicated schematically in FIG. 3 is connected for EPROM 18. With the aid of the charge pump the writing speed can be increased for writing the EPROM.

Embodiments with and without a shunt regulator in microchip 10 are possible. Such a shunt regulator can be activated alternatively to charge pump 16 when the maximum clock frequency is reached, but the shunt regulator can also be used as a third element for keeping voltage $U_{dd}$ constant if the clock frequency was increased up to the maximum limit and charge pump 16 is also working at maximum power.

Figure 6:
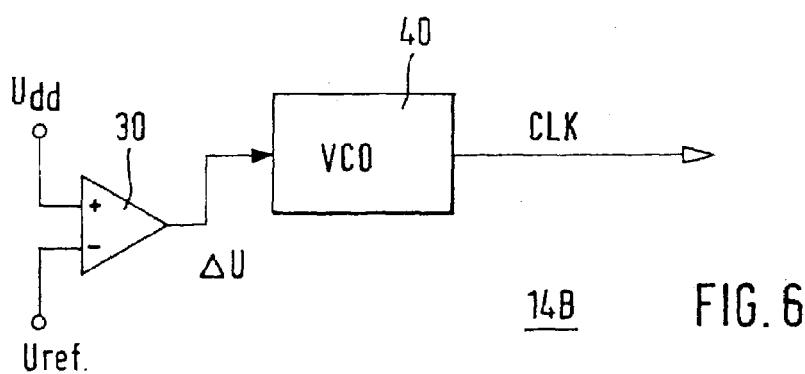
FIG. 6 shows a block diagram of a further special embodiment of a clock frequency adjusting device of the inventive transponder.

FIG. 6 shows an alternative for the clock generator according to FIG. 5. Clock generator 14B shown in FIG. 6 delivers differential signal $\Delta u$ obtained as in FIG. 5 to voltage-controlled oscillator (VCO) 40. At small distances between transponder and reader and accordingly great differential signal $\Delta u$ the output frequency of VCO 40 is relatively high, at small signal $\Delta u$ the frequency of the output signal of VCO 40 is relatively low. The VCO can have further signal processing circuits connected thereto, for example signal conditioner circuits, frequency dividers, etc. The advantage of this embodiment is that the maximum output frequency of the VCO (with CMOS over 50 MHz at present) can be greater than the clock frequency of the reader coupled in on coil L2 (13.56 MHz).

The inventive transponder is integrated into a contactless smart card, which is not shown in the drawing because it is known in principle. Further possibilities of use for transponders are likewise known, for example encapsulation for administration to animals, incorporation in an auto key for an automatic immobilizer and the like. The inventive transponder is used in all these applications.

The invention claimed is:

1. A transponder comprising an internal digital circuit operated by a clock generator arranged to generate a clock signal having a clock frequency, and an internal energy supply arranged to be supplied contactlessly by an external alternating magnetic field, said clock generator comprising a clock frequency adjusting device arranged to adjust the clock frequency of the clock signal in dependence on a field strength of an external magnetic field on the transponder, said transponder further including a receiving antenna for receiving the external magnetic field and a rectifier connected to the receiving antenna for rectifying a voltage induced in said antenna by said external magnetic field, wherein the clock frequency of the clock signal is adjusted based on a difference signal representative of a difference between an unregulated voltage provided at the output of the rectifier and an internally generated reference voltage.

2. The transponder according to claim 1, wherein the unregulated voltage provided at the output of the rectifier, which is representative of the field strength of the magnetic field on the receiving antenna, is supplied as an actuating signal to the clock frequency adjusting device.

3. The transponder according to claim 2, wherein the clock frequency adjusting device is formed as a voltage-controlled oscillator (VCO) having an input arranged to receive the unregulated voltage or a signal value derived therefrom, and an output that delivers the clock signal or a precursor signal of the clock signal.

4. The transponder according to claim 2, wherein the clock frequency adjusting device comprises:
   an analog-to-digital converter arranged to convert the unregulated voltage into a digital value;
   a frequency divider with an adjustable division ratio,
      having a first input arranged to receive a fixed-frequency signal that is derived from a voltage induced on the coil, and,
      a second input arranged to receive through the analog-to-digital converter a divisor signal derived from the unregulated voltage, and
      an output that delivers the clock signal.

5. The transponder according to claim 1, including an interface circuit (20) arranged to carry out data exchange with an external device and which is operated with a communication clock signal of fixed frequency.

6. The transponder according to claim 1, wherein the clock generator is arranged to readjust the clock frequency of the clock signal in a manner linearly dependent on the energy available on the transponder through the magnetic field within a defined working area.

7. The transponder according to claim 1, wherein the clock generator is arranged to lower the clock frequency with respect to a defined nominal clock frequency in order to permit operation of the digital circuit when the field strength of the magnetic field on the transponder falls below a nominal value.

8. The transponder according to claim 6, including a charge pump (16), and a shunt regulator associated with the digital circuit, wherein
   the charge pump is arranged to increase a writing speed of an EPROM (18) comprising the digital circuit when a defined maximum clock frequency is reached; and/or
   the shunt regulator is arranged to be activated in order to convert excess energy into heat with the aid of a resistive element.

9. The transponder according to claim 4, wherein the first input of the frequency divider is connected to an oscillator that delivers a signal of fixed frequency.

10. A contactless smart card with a transponder according to claim 1.

11. An identification element with a transponder according to claim 1.

12. An identification element according to claim 11 in the form of an auto key comprising an electronic key for releasing an electronic immobilizer.

13. An identification element according to claim 11 associated with a capsule for incorporation in a living creature.

* * * * *